May 26, 1925.
P. SYLVESTER
PROCESS OF MAKING ORNAMENTAL TILE
Filed Nov. 30, 1923
1,539,148
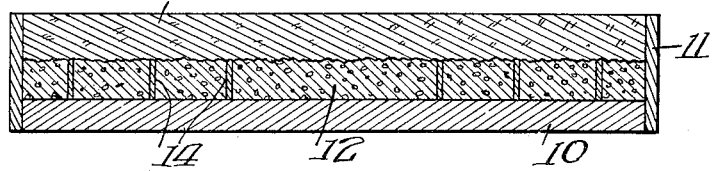
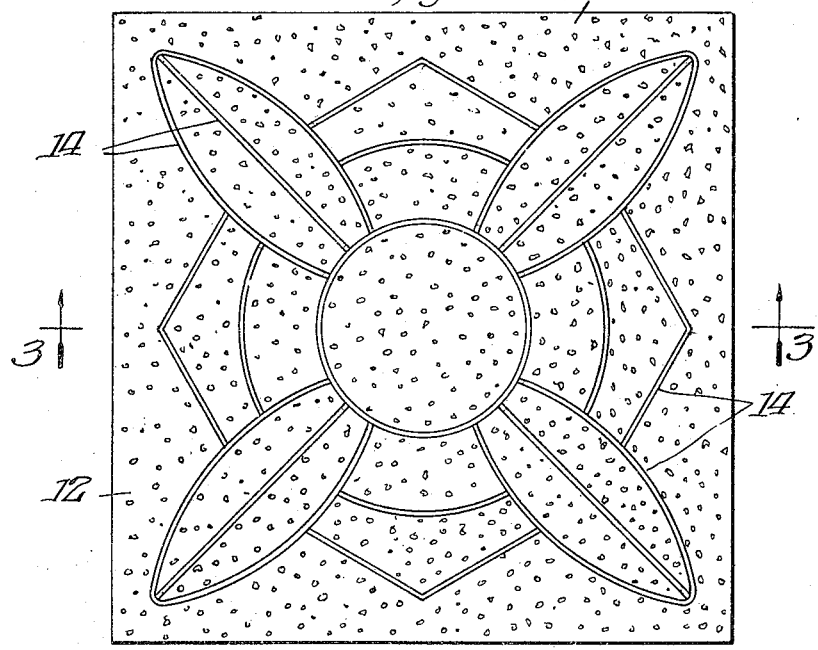
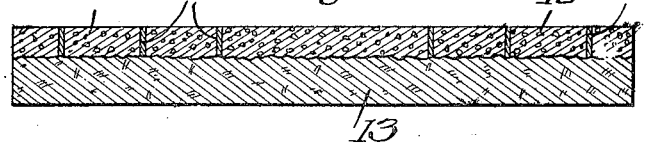
Inventor:
Pascal Sylvester,
By Fisher Towle Clapp & Soans
Attys.

Patented May 26, 1925.

1,539,148

UNITED STATES PATENT OFFICE.

PASCAL SYLVESTER, OF CHICAGO, ILLINOIS.

PROCESS OF MAKING ORNAMENTAL TILE.

Application filed November 30, 1923. Serial No. 677,752.

*To all whom it may concern:*

Be it known that I, PASCAL SYLVESTER, a citizen of the United States, residing in Chicago, in the county of Cook and State of Illinois, have invented certain new and useful Improvements in Processes of Making Ornamental Tiles, of which the following is a specification.

My invention relates to the manufacture of ornamental tiles and has particular reference to tiles made with a terrazzo facing.

The principal objects of the invention are to provide a portable or transportable tile or slab having a terrazzo face and a metallic inlay forming an ornamental pattern in the face of the tile; to provide a tile of the class described which may be manufactured in convenient desired sizes without danger of breakage and which may be conveniently laid or installed without the necessity of performing complicated operations at said place; and to provide an improved process for the manufacture of such tiles.

In the drawings which illustrate a preferred application of my invention,

Fig. 1 represents a cross sectional elevation showing a tile or slab in course of manufacture;

Fig. 2 is a plan or face view of a tile made in accordance with my invention, and Fig. 3 is a section taken on the line 3—3 of Fig. 2.

In carrying out my invention, I first prepare a mold which preferably comprises a supporting table or slab 10 having a confining flange 11 projecting upwardly a distance equal to the desired thickness of the slab and surrounding an area of shape and dimensions corresponding to the completed tile.
Having decided upon the pattern or outline, I prepare a grillage, constructed in accordance with the pattern, of a series of strips of metal, preferably aluminum, aluminum having substantially the same resistance to abrading, and which will wear off evenly with the terrazzo and not project upwardly and require grinding off from time to time as the tile wears.

The metal strips which compose the grille are located edgewise of the supporting surface 10 as shown in Fig. 1.

Such locating of the strips may be accomplished in various ways, depending upon the particular style or type of pattern selected.
In some cases it may be desirable to integrally unite or otherwise tie together the abutting parts, ends or edges of the strips so that the grilles may be made up ahead in quantity before commencing the actual molding of the tiles. In other cases where rather elaborate and unusual patterns are desired, I may take a slab or panel of suitable lumber, and, having traced the pattern on the surface of the slab, saw out along the outlines of the pattern by means of a suitable scroll or band saw. The thickness of the saw kerf should preferably be substantially equal to or slightly greater than the thickness of the strips which are to be used. The wooden form is then placed on the confined supporting slab 10 and the metal strips of the proper length are bent and formed so as to occupy the kerfs made by the operation of the sawing.

The cement mix containing chips of marble or other stone or rock forming the aggregate of the terrazzo concrete is then filled in the pockets of the grille and around the latter within the mold, it being understood that the wooden forms are removed one by one as the filling proceeds, so that the strips composing the grille will be adequately supported during the laying in of the terrazzo concrete 12.

If the grilles are made up in advance by connecting together several strips composing same, it will be manifest that the entire layer of terrazzo concrete filling may be applied at the same time. If desired, different parts of the form, that is to say, different pockets formed by the grillage may be filled with terrazzo concrete of different colors, although, according to my invention, the tile may be made of a single color, and still possess a striking and ornamental appearance.

The terrazzo facing layer is of the usual thickness employed in terrazzo work, that is to say, approximately half an inch, and preferably the metal strips which compose the grillage are of about the same width as the thickness of the terrazzo layer. After the terrazzo concrete layer has been applied, and preferably without waiting for the same to set, a backing layer 13 of ordinary concrete suitably mixed so as to furnish maximum strength, is deposited on the top of the terrazzo facing layer until it overlies the upper surface of the latter and the upper edges of the grillage 14 to the required depth or thickness. If desired, in order to absorb excess moisture in the terrazzo mix, a relatively dry layer of mixed cement and sand may be spread on the terrazzo layer before filling in the concrete backing layer.

After the laying in of the concrete backing layer has been completed, it is roughly screened off to the height of the flanges 11 and the mold is placed under the ram of a hydraulic press for the purpose of compacting and consolidating together the layers of cementitious material. After the concrete has set sufficiently, the tile is removed from the mold and allowed to harden. When hard, the terrazzo facing layer and the exposed edges of the grillage invested therein are ground off to the required depth to bring out the characteristic terrazzo finish. The article is then ready to be transported to the place of installation, where, if desired, after laying, it may be given a further final grinding or polishing.

Tiles or slabs made according to the above process, by means of the concrete backing which is not filled up by metal partitions as is the terrazzo facing layer, are found to be very rugged and substantial, and will readily withstand the abuse encountered in transporting and installing the tiles. Whether made in different colors or of uniform facing material throughout the area of the tile, the pattern outline formed by the edges of the aluminum grille stands out quite prominently and imparts to the tile a particularly ornamental and distinctive appearance.

The tiles are improved in appearance, durability and strength by immersing them for three or four days immediately after setting, in a concentrated solution of rock alum.

The scope of my invention, which is subject to certain modifications, as will be apparent to those skilled in the art, should be determined by the appended claims, said claims being construed as broadly as possible, consistent with the state of the art.

I claim as my invention:

1. The method of manufacturing ornamental tiles or slabs which consists in locating on a confined flat supporting surface a grillage of metal strips arranged edgewise to form open-ended pockets, depositing over said surface and in said pockets a layer of concrete containing an ornamental aggregate, depositing on said first layer, a second layer of concrete of thickness sufficient to cover the upper edges of the strips to a substantial depth, permitting the layers to harden, removing the tile from the supporting surface, and subsequently grinding off the face of the tile and the exposed edges of the grillage.

2. The method of manufacturing ornamental tiles or slabs which consists of locating on a confined flat supporting surface a grillage of metal strips arranged edgewise to form open-ended pockets, depositing over said surface and in said pockets a layer of concrete containing an ornamental aggregate, permitting the layer to harden, and subsequently grinding off the face of the tile and the exposed edges of the grillage.

PASCAL SYLVESTER.